UNITED STATES PATENT OFFICE

LEONARD PHILIP WILSON, OF COVENTRY, ENGLAND, ASSIGNOR TO COURTAULDS LIMITED, OF LONDON, ENGLAND.

REGENERATION OF SULFIDS OF THE ALKALIS OR ALKALINE EARTHS.

1,106,266.  Specification of Letters Patent.  Patented Aug. 4, 1914.

No Drawing.  Application filed September 25, 1913. Serial No. 791,879.

*To all whom it may concern:*

Be it known that I, LEONARD PHILIP WILSON, a subject of the King of Great Britain, residing at 8 Chester street, Coventry, in the county of Warwick, England, have invented new and useful Improvements in the Regeneration of Sulfids of the Alkalis or Alkaline Earths, of which the following is a specification.

Solutions of sulfids of the alkalis or alkaline earths, are well known as solvents for sulfur; thus for example, sodium sulfid, acts by forming polysulfids, which when formed are unable to dissolve any further quantity of sulfur. In order therefore that the solvent action may continue it becomes necessary to add further quantities of the sulfid. Ultimately a point is reached when, owing to the accumulation of sulfids and polysulfids, it is either necessary to throw away the solution, or to decompose it, for example with acid, and collect the hydrogen sulfid with caustic soda to produce a new solution. Polysulfids are often formed when sulfid solutions are used in other ways, and in such cases regeneration is equally desirable.

The present invention relates to a process by which solutions of polysulfids of the alkalis or the alkaline earths such as used alkali, or alkaline earth sulfid solutions containing polysulfids may be directly regenerated, or converted into solutions containing little or no polysulfid, but practically only monosulfid, which solutions are then capable of being again used for example as solvents. According to this invention, in order to effect this conversion, glucose together with or replaced by other suitable soluble organic reducing agent or agents or glucose alone and an alkali or alkalis, in the form of a soluble hydrate, or carbonate or hydrates or carbonates or a soluble hydrate or hydrates of an alkaline earth or earths, are added to the polysulfid solution in suitable quantities, dependent on the amount of polysulfid present in the solution, the mixture preferably being heated. Starch and dextrin are examples of other organic substances which have a suitable reducing action when used in solutions of alkaline substances such as sodium hydrate, potassium carbonate or barium hydrate.

The effect of the reaction may be measured by titration with standard iodin solution; for example, 142 grams of sodium polysulfid $Na_2S_3$, will combine with 254 grams of iodin:—

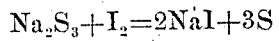
$$Na_2S_3 + I_2 = 2NaI + 3S$$

but the same amount of polysulfid after conversion into normal sulfid by the method described, will require three times as much iodin, viz: 762 grams:—

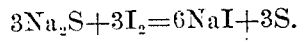
$$3Na_2S + 3I_2 = 6NaI + 3S.$$

This invention is well adapted for use for regenerating the alkali sulfid solution, which is used for extracting the sulfur from artificial silk produced by the viscose process. For example, after say, one hundred pounds of the said silk have been treated in a solution of 1 per cent. sodium sulfid, 2¼ to 3 lbs., of commercial glucose and 3 lbs. of caustic soda, both in solution, are added, and the next batch of silk to be treated is immediately passed into the bath, and so on, a bath so treated being capable of use for long periods. In addition to the fact that it is unnecessary to throw away the solution because it has become saturated with sulfur, or to interfere in any way with the continuous working of the bath, the solution thus kept practically free from polysulfid is much more efficient than would otherwise be the case, and the time required for extracting the sulfur from the silk is correspondingly reduced.

This invention is not limited to the example given, as it is capable of many other applications in which the solutions containing polysulfids require to be regenerated or converted into sulfids, as for example in solutions used for the denitration of nitrocellulose.

In the following claims "alkaline matter" means alkali or alkaline earth and "organic reducing substance" means glucose, or other suitable organic reducing substance, or mixtures of such substances.

What I claim is:—

1. The conversion of soluble polysulfids into monosulfids by the addition to the said soluble polysulfids in aqueous solution of alkaline matter and organic reducing substance.

2. The regeneration of solutions which contain polysulfids, and which have been used in the manufacture of artificial silk, by adding alkaline matter and organic reducing substance.

In testimony whereof I have signed my name to this specification in the presence of two subscribing witnesses.

LEONARD PHILIP WILSON.

Witnesses:
SIDNEY S. NAPPER,
WILLIAM H. STOKES.